(12) United States Patent
Hayden

(10) Patent No.: US 6,384,755 B1
(45) Date of Patent: May 7, 2002

(54) METHOD AND APPARATUS FOR ANALOG TO DIGITAL CONVERSION USING AN IMPEDANCE DEVICE AS AN IDENTIFIER

(75) Inventor: Douglas Todd Hayden, Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/289,027

(22) Filed: Apr. 9, 1999

(51) Int. Cl.[7] .......................... H03M 1/06; H03M 1/10
(52) U.S. Cl. ...................... 341/120; 341/118; 710/16
(58) Field of Search ................... 341/155, 120, 341/118; 340/500; 73/29; 702/106; 710/16

(56) References Cited

U.S. PATENT DOCUMENTS

| | | | | |
|---|---|---|---|---|
| 4,524,349 A | * | 6/1985 | Hyatt .......................... | 340/500 |
| 5,598,157 A | * | 1/1997 | Kornblum et al. .......... | 341/120 |
| 5,606,515 A | * | 2/1997 | Mockapetris et al. ....... | 702/106 |
| 5,767,500 A | * | 6/1998 | Cordes et al. .............. | 255/472 |
| 5,983,288 A | * | 11/1999 | Visee .......................... | 710/16 |
| 6,138,182 A | * | 10/2000 | Hennessy et al. ........... | 710/16 |

* cited by examiner

Primary Examiner—Patrick Wamsley

(57) ABSTRACT

An analog information storage arrangement includes an impedance device, operatively connected to a module, for providing an impedance value corresponding to encoded information. A decoding device is operatively connected to the impedance means. The decoding device reads the impedance value of the impedance device. The impedance device can be provided as an encoded resistor and reference resistor. The decoding device can include a comparator for comparing the read impedance value to a reference impedance value, which can be a resistance read from the reference resistor of the impedance device. Alternatively, the impedance device can be provided as an encoded capacitor and reference capacitor. The decoding device can include a comparator for comparing the read impedance value to a reference impedance value, which can be a capacitance read from the reference capacitor of the impedance device. The decoding device can be provided as an 8-bit or 24-bit analog-to-digital converter. The encoded information can be selected from a group consisting of serial number, location, hardware revision, and date of manufacture. A method of storing and retrieving analog information in an electronic system including at least one replaceable module is also set forth. The method includes the step of providing, in a module, an electrical component containing an impedance value corresponding to encoded information. Next, the impedance value of the impedance is read and assigning an identification value.

20 Claims, 4 Drawing Sheets

METHOD AND APPARATUS FOR ANALOG TO DIGITAL CONVERSION USING AN IMPEDANCE DEVICE AS AN IDENTIFIER

FIELD OF THE INVENTION

The present invention relates to the storage and access of electronic system identification information. Specifically, the present invention relates to the storage and retrieval of analog identification information in electronic systems having replaceable modular components.

BACKGROUND OF THE INVENTION

Modular systems, in which various components may be individually added, removed, or replaced, have revolutionized the design of electronic systems. This is nowhere more apparent than in data storage devices such as RAID systems, where the storage and control components associated with the arrays of independent disks can be installed, eliminated, or upgraded virtually at will.

With the variable combinations of components in such systems, it is often desirable to provide some mechanism for electronically identifying the component within the system. Information such as serial number, location identification, hardware revision, or component date of manufacture may be useful in integrating the component into the system as a whole. Typically, this kind of information has been handled by reading a set of binary strapped connector pins, as shown in FIG. 1. In this approach, binary identification information stored in a module M1 is transmitted to a digital latch D via strapped connector pins C. It is also known to use active programmed memory devices communicating in serial or parallel, as shown in FIG. 2. In this arrangement, identification is stored in a module M2 in a memory device such as a serial E2PROM S, and shared with the system microprocessor S.

Unfortunately, these known information storage systems have potentially serious drawbacks. For example, if the information is stored as a binary number, the pin count required to transmit the information through a connector may not be tolerable. The use of a programmed memory device, even when available, complicates the manufacture of a component, and the possibility of data corruption may affect its reliability.

It can thus be seen that the need exists for a simple, inexpensive, and reliable way to store and retrieve identification information in modular systems.

SUMMARY OF THE INVENTION

An analog information storage arrangement is provided in an electronic system including at least one replaceable module. At least one analog electrical identification component installed in a module. The electrical component has an electrically readable property set to a predetermined value corresponding to identification information. An analog-to-digital converter is electrically connected to the at least one analog electrical identification component. The analog-to-digital converter is adapted and constructed to read the electrically readable property as an analog value and produce a digital identifier, such as a binary number.

The electrical identification component can be provided as a simple electrical component, such as a resistor or a capacitor. The analog-to-digital converter can be adapted to compare the read electrical property to a reference value.

In an embodiment, the analog information storage arrangement includes an impedance device, operatively connected to a module, for providing an impedance value corresponding to encoded information. A decoding device is operatively connected to the impedance device. The decoding device reads the impedance value of the impedance device.

The impedance device can be provided as an encoded resistor and reference resistor. The decoding device can include a comparator for comparing the read impedance value to a reference impedance value, which can be a resistance read from the reference resistor of the impedance device.

Alternatively, the impedance device can be provided as an encoded capacitor and reference capacitor.

The decoding device can be provided as an analog-to-digital converter, such as an 8-bit or 24-bit analog-to-digital converter. The encoded information can be selected from a group consisting of serial number, location, hardware revision, and date of manufacture.

A method of storing and retrieving analog information in an electronic system including at least one replaceable module is also set forth. The method includes the step of providing, in a module, an electrical component containing an impedance value corresponding to encoded information. Next, the impedance value of the impedance is read and assigning an identification value.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF THE INVENTION

Figure 1:
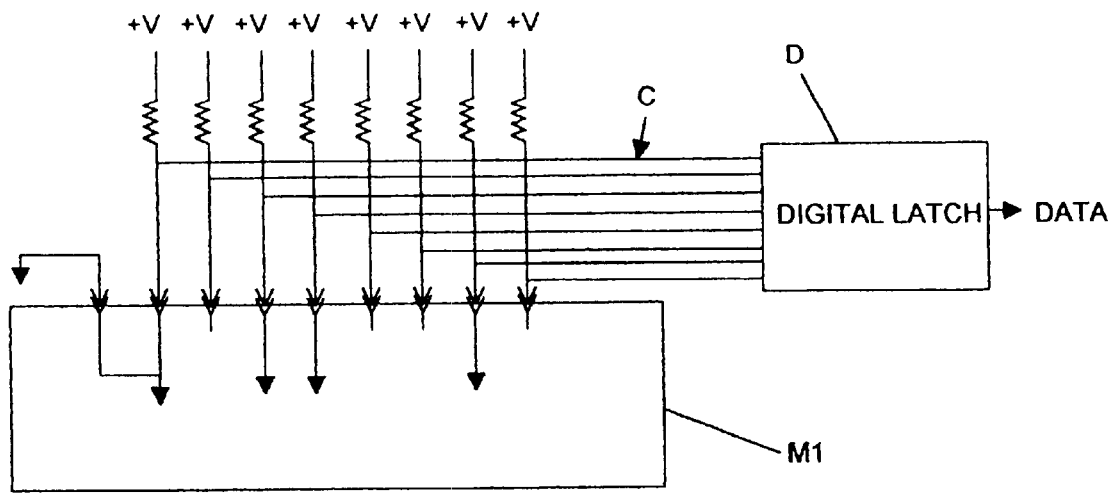
FIGS. 1 and 2 illustrate known arrangements as set forth in the Background of the Invention.
Figure 2:
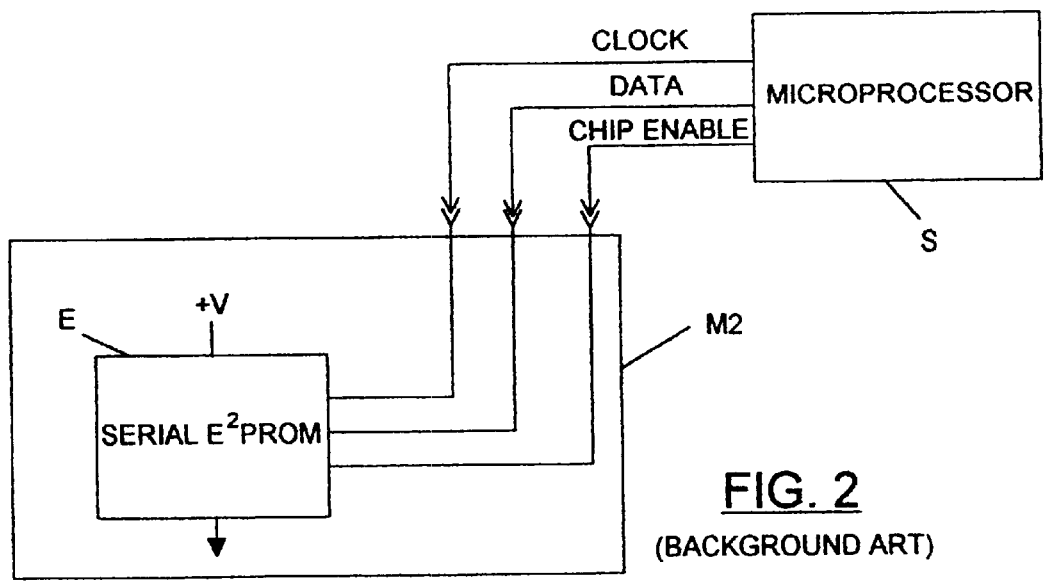

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

Figure 3:
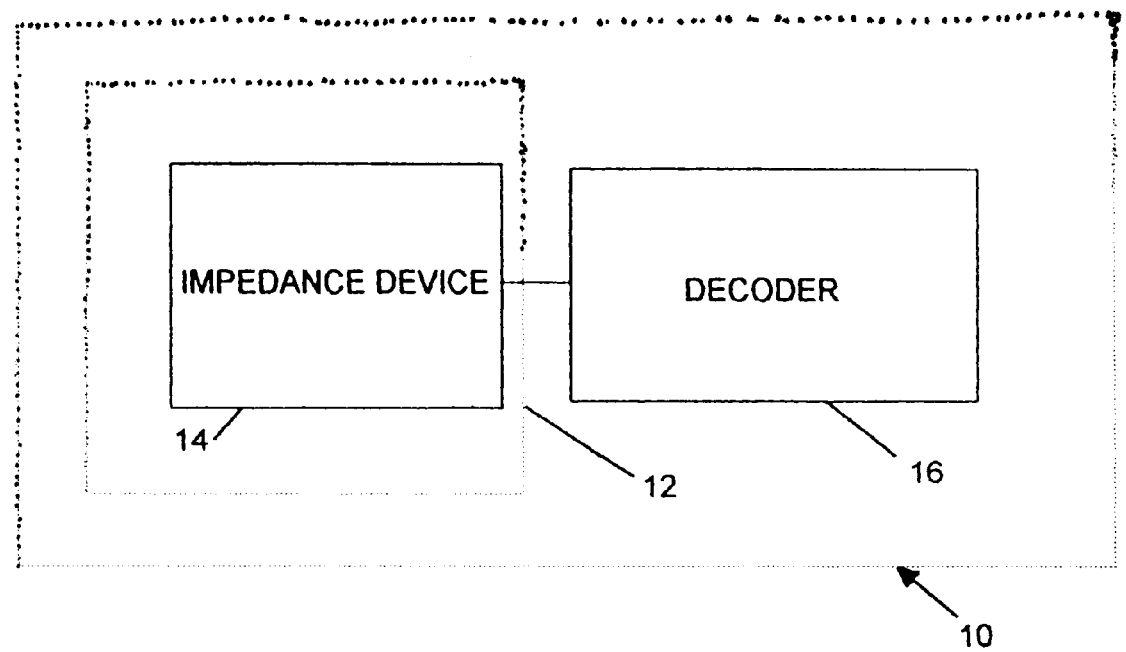
FIG. 3 is a schematic illustration of a modular electronic system having an analog information storage arrangement in accordance with the principles of the present invention.

FIG. 3 illustrates a modular electronic system 10 capable of receiving at least one replaceable module, such as module 12. The module 12 includes an analog electrical identification component, here shown as an impedance device 14. The impedance device 14 contains an impedance value corresponding to encoded information. This impedance value can be provided as a relatively simple electrical property of the impedance device. For example, the impedance device can be provided as a resistor or capacitor, in which instance the encoded electrical property would be, respectively, resistance or capacitance. The system 10 also includes a decoding device. The decoding device 16 is operatively connected to the impedance device 14, and is adapted to read the impedance value of the impedance device 14.

Figure 4:
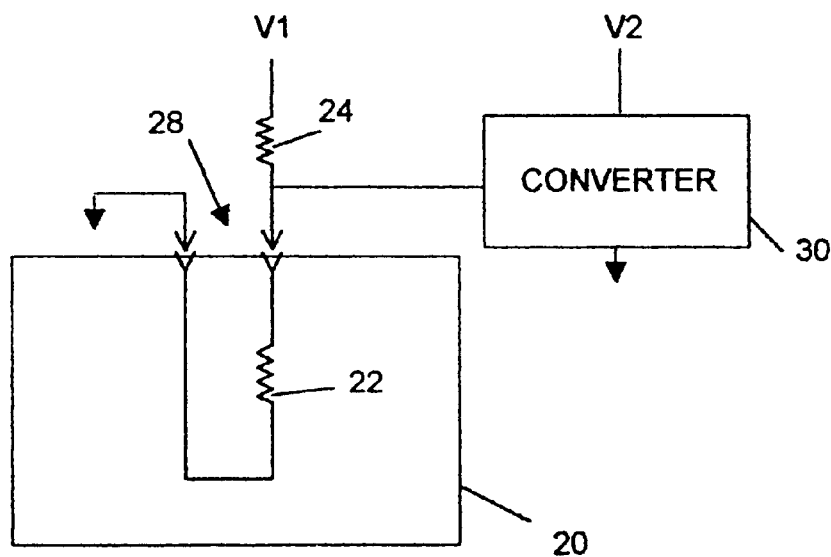
FIG. 4 is a detailed schematic diagram of an analog information storage arrangement.

As shown in FIG. 4, a module 20 includes a variable resistor 22 onto which information has been encoded. Information can be encoded on the resistor 22, for example, by trimming or cutting branches of a ladder-like structure. When the variable resistor 22 divides down the supply voltage Vs from a known, stable, low-cost resistor 24, the scaling factor of the trimmed resistor 22 can be determined. The encoded information is transmitted to the rest of the system through a connector 28. The voltage output from the resistors 22, 24 can be fed into the decoder, which can include an analog-to-digital converter 30. The specifics of the converter 30 can vary depending upon the nature of the encoded information. For example, a module associated with an 8-bit converter could be set up to read the resistor value "serial number", which has been trimmed to better than 8-bit resolution. Other encoded information may require larger numbers, which may be handled by a higher resolution converter.

Figure 5:
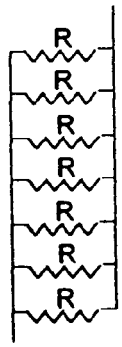
FIGS. 5 through 7 illustrate alternative resistive impedance devices.
Figure 6:
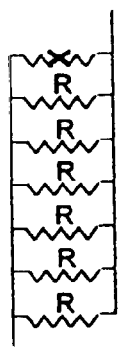
Figure 7:
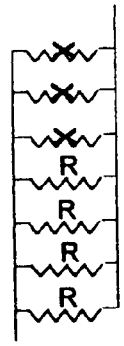

FIGS. 5 through 7 illustrate alternative resistive impedance devices. By trimming or cutting branches the variable resistor can be encoded for discrete values of Rvar=R/7, Rvar=R/6, and Rvar=R/4, respectively.

The operation of the arrangement illustrated in FIG. 4 can be understood using the following values. Assuming that the value of the resistor 24 ("$R_{known}$") is 1000, and that the variable resistor has encoded values of 1000, 875, 750, 625, 500, 375, 250, and 125, and that the supply voltage Vs is 5V, the encoded values ("$V_{encoded}$") of the variable resistor 22, at its respective values read through the converter 30, would be as follows:

5(Radj)/(Rknown+Radj)=$V_{encoded}$
2.5
2.333
2.143
1.923
1.667
1.364
1
0.556

Thresholds can be set between the readings to determine the encoded value. For example, if the information threshold is set at 2.4V to determine uppermost value, then 2.25V<voltage<2.4V=value 7; voltage>2.4V=value 8, etc.

However, this basic system may present problems where the resistors are not absolutely accurate. For example, if the value of the resistor 22 is just 10% lower than its nominal value, the following would ensue:

5(.90$R_{adj}$)/($R_{known}$+.90$R_{adj}$)=$V_{encoded}$
2.368
2.203
2.015
1.8
1.552
1.262
0.918
0.506

In this case, using the previously-determined thresholds would give us value 8 for >2.4V, which is incorrect.

Figure 8:
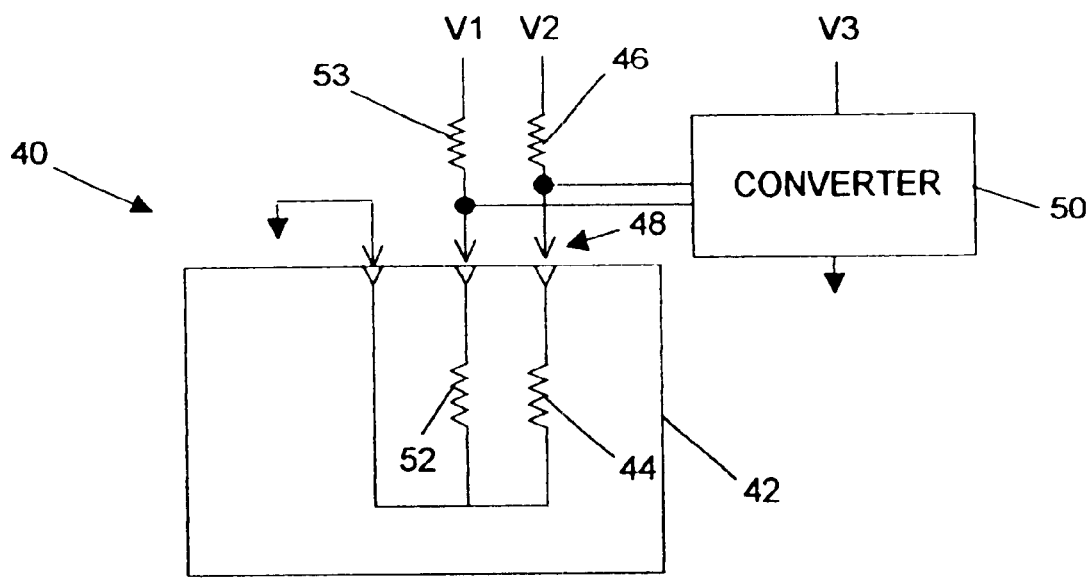
FIG. 8 is a detailed schematic diagram of an alternative embodiment of an analog information storage arrangement.

This potential problem can be resolved by the alternative embodiment of an analog information storage arrangement 40, as shown in FIG. 8. The arrangement 40 includes a module 42 having a variable resistor 44 onto which information has been encoded. Information can be encoded on the resistor 44, for example, by trimming or cutting branches of a ladder-like structure. When the variable resistor 44 divides down the supply voltage Vs from a known, stable, low-cost resistor 46, the scaling factor of the trimmed resistor 44 can be determined. The encoded information is transmitted to the rest of the system through a connector 48. The voltage output from the resistors 44, 46 can be fed into a decoder 50 that functions in much the same way as the decoder 30 previously described.

In order to make the resistor trimming non-critical, an untrimmed reference resistor 52 is provided. The process of the resistor 52 is similar or identical to that of the resistor 44, and is connected to voltage supply via resistor 53, which is identical to resistor 46. The addition of the reference resistor 52 enables the use of ratiometric methods in the calculation of the encoded value. This in turn allows for more resolution in the trimmed resistor for higher density information encoding.

Use of ratiometric techniques are set forth in following examples: By adding Rref and using ratiometric methods:

Using the same assumptions as in the previous example, and assuming further that the value of the reference resistor 52 ($R_{ref}$) is 1000, if resistor 52 and resistor 44 ($R_{adj}$) are both 10% lower than their nominal values, then 5(.90$R_{ref}$)/($R_{known}$+.90$R_{ref}$)=$V_{ref}$=2.368 and using the previously calculated range of encoded values divided by $V_{ref}$=2.368 gives the following ratios:

| $V_{encoded}$ | Ratio = $V_{encoded}/V_{ref}$ |
|---|---|
| 2.368 | 1 |
| 2.203 | .93 |
| 2.015 | .851 |
| 1.8 | .76 |
| 1.552 | .655 |
| 1.262 | .533 |
| 0.918 | .388 |
| 0.506 | .214 |

If resistor 52 and resistor 44 are both 10% higher than their nominal values, then $V_{ref}$=5(1.1$R_{ref}$)/($R_{known}$+1.1$R_{ref}$)=2.619 and calculating the new range of encoded values from the previous resistor range (1000, 875, 750, 625, 500, 375, 250, and 125) and dividing by the new $V_{ref}$=2.619 gives the following ratios:

| 5(1.1 $R_{adj}$)/($R_{known}$ + 1.1 $R_{adj}$) = $V_{encoded}$ | Ratio = $V_{encoded}/V_{ref}$ |
|---|---|
| 2.619 | 1 |
| 2.452 | .936 |
| 2.26 | .863 |
| 2.037 | .778 |
| 1.774 | .677 |
| 1.46 | .557 |
| 1.078 | .412 |
| 0.604 | .231 |

As can be seen from these examples, the threshold values are better maintained using ratiometric methods. For example, if the information threshold is set at 1 to determine uppermost value, then 0.89<Ratio<0.96=value 7; Ratio>0.96=value 8, etc.

Figure 9:
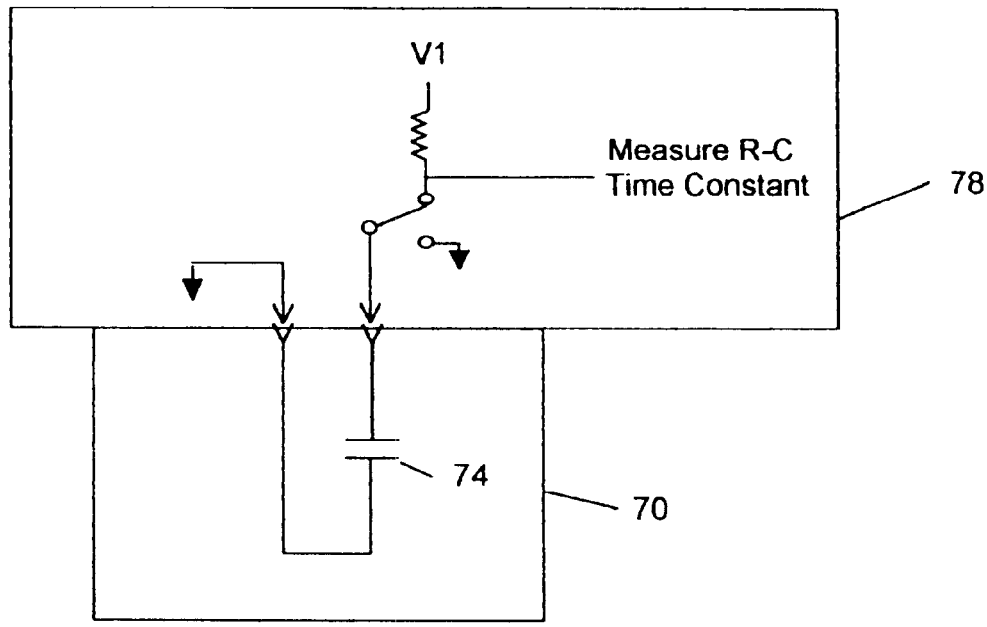
FIGS. 9 and 10 illustrate alternative embodiments of analog information storage arrangements.
Figure 10:
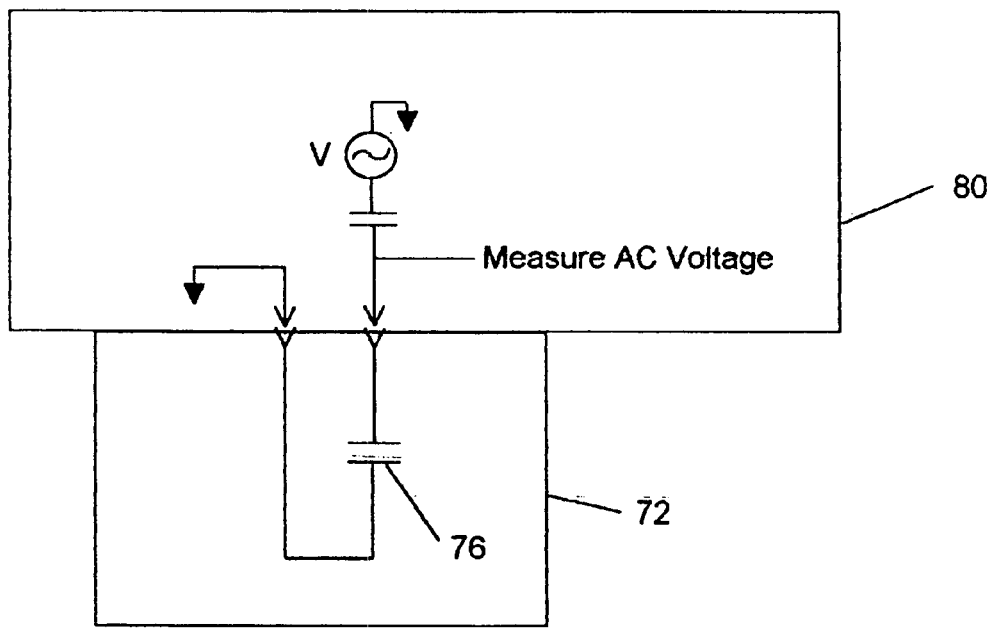

As can be seen in FIGS. 9 and 10, the respective modules 70 and 72 can be provided with variable capacitors 74, 76 as impedance sources for encoding identification information. In these examples, the information from the decoders 78, 80 can be used to measure properties such as AC voltage or R-C time constants. Furthermore, ratiometric techniques using input from reference capacitors can be employed to increase accuracy, similar to the examples set forth with reference to FIG. 8.

The present invention enables the number of pins required for transmitting the identification information to be reduced significantly. For example, assuming the ground pin is available, the number of pins can be reduced from 8 pins to one pin in an 8-bit system, and from 24 to 3 pins in a 24-bit system, assuming 8-bit resolution in the encoding scheme.

The present invention is applicable to any high-reliability system in which it is advantageous to share module information such as serial numbers, locations, hardware revision, and dates of manufacture among various system components. The total passivity of the present approach results in high reliability. Since no semiconductor memory is involved, the system of the present invention is not corruptible. Non-critical resistive trimming can be used during the manufacturing of the module itself, which allows the impedance device to be simply and expeditiously "programmed". Additionally, the present invention can be configured so that no power is required on the module with encoded data.

While details of the invention are discussed herein with reference to some specific examples to which the principles of the present invention can be applied, the applicability of the invention to other devices and equivalent components thereof will become readily apparent to those of skill in the art. Accordingly, it is intended that all such alternatives, modifications, permutations, and variations to the exemplary embodiments can be made without departing from the scope and spirit of the present invention.

What is claimed is:

1. In an electronic system including at least one replaceable module, an analog information storage arrangement comprising the following:
   at least one analog electrical identification component installed in a module such that replacement of the module entails replacement of the electrical identification component, the electrical component having an electrically readable property set to a predetermined value corresponding to identification information pertaining to the module, the predetermined value being determined using ratiometric techniques; and
   an analog-to-digital converter electrically connected to the at least one analog electrical identification component, the analog-to-digital converter being adapted and constructed to read the electrically readable property as an analog value and produce a digital identifier.

2. A storage arrangement according to claim 1, wherein the electrical identification component comprises a resistor.

3. A storage arrangement according to claim 1, wherein the electrical identification component comprises a capacitors.

4. A storage arrangement according to claim 1, wherein the analog-to-digital converter is adapted to compare the read electrical property to a reference value.

5. In an electronic system including at least one replaceable module, an analog information storage arrangement comprising the following:
   impedance means, operatively connected to a module such that replacement of the module entails replacement of the impedance means, for providing an impedance value corresponding to encoded information pertaining to the module, the impedance value being determined using ratiometric techniques; and
   decoding means, operatively connected to the impedance means, for reading the impedance value of the impedance means.

6. A storage arrangement according to claim 5, wherein the impedance means comprises at least one resistor.

7. A storage arrangement according to claim 6, wherein the impedance means further comprises an encoded resistor and reference resistor.

8. A storage arrangement according to claim 7, further comprising means for comparing the read impedance value to a reference impedance value.

9. A storage arrangement according to claim 8, wherein the reference impedance value is a resistance read from the reference resistor of the impedance means.

10. A storage arrangement according to claim 5, wherein the impedance means comprises at least one capacitor.

11. A storage arrangement according to claim 10, wherein the impedance means further comprises an encoded capacitor and reference capacitor.

12. A storage arrangement according to claim 11, further comprising means for comparing the read impedance value to a reference impedance value, and wherein the reference impedance value is a capacitance read from the reference capacitor of the impedance means.

13. A storage arrangement according to claim 5, wherein the decoding means comprises an analog-to-digital converter.

14. A storage arrangement according to claim 13, wherein the decoding means comprises an 8-bit analog-to-digital converter.

15. A storage arrangement according to claim 13, wherein the decoding means comprises a 24-bit analog-to-digital converter.

16. A storage arrangement according to claim 5, wherein the encoded information is selected from a group consisting of serial number, location, hardware revision, and date of manufacture.

17. In an electronic system including at least one replaceable module, a method of storing and retrieving analog information, the method comprising the following steps:
   providing, in a module, an electrical component containing an impedance value corresponding to encoded information pertaining to the module, the electrical component being mounted in the module such that replacement of the module entails replacement of the electrical component module, the impedance value being determined using ratiometric techniques;
   reading the impedance value of the electrical component; and
   assigning an identification value to the read impedance value.

18. A method according to claim 17, wherein the step of providing an electrical component comprises providing a resistor, and wherein the impedance value is resistance.

19. A method according to claim 17, wherein the step of providing an electrical component comprises providing a capacitor, and wherein the impedance value is capacitance.

20. A method according to claim 17, wherein the step of assigning an identification value comprises assigning an identification value selected from a group consisting of serial number, location, hardware revision, and date of manufacture.

* * * * *